United States Patent [19]
Degi et al.

[11] Patent Number: 5,479,207
[45] Date of Patent: Dec. 26, 1995

[54] SYSTEM AND METHOD FOR IMPROVING THE SIGNAL TO NOISE RATIO OF A CCD SENSOR IN AN OPTICAL SCANNER

[75] Inventors: Greg A. Degi, Fort Collins; Gerald L. Meyer; Steven L. Webb, both of Loveland, all of Colo.

[73] Assignee: Hewlett-Packard Company, Palo Alto, Calif.

[21] Appl. No.: 196,617

[22] Filed: Feb. 14, 1994

[51] Int. Cl.[6] .................................................. H04N 3/14
[52] U.S. Cl. ........................ 348/297; 348/312; 348/362
[58] Field of Search .................................. 348/223, 362, 348/312, 297; H04N 3/14

[56] References Cited

U.S. PATENT DOCUMENTS

| | | | |
|---|---|---|---|
| 4,701,626 | 10/1987 | Ishizaki et al. | 348/297 X |
| 4,926,041 | 5/1990 | Boyd | 250/226 |
| 5,182,658 | 1/1993 | Ishizaki et al. | 348/297 X |
| 5,239,387 | 8/1993 | Stein et al. | 358/444 |
| 5,337,163 | 8/1994 | Kawamoto et al. | 348/297 X |

*Primary Examiner*—Michael T. Razavi
*Assistant Examiner*—Wendy R. Greening

[57] ABSTRACT

A system and method for improving the signal to noise ratio of a CCD sensor within an optical scanner varies the exposure time of the CCD sensor. Exposure time is varied by clocking the CCD sensor a number of times equal to the number of pixels in the CCD sensor plus an additional number of clock cycles to create a delay. The additional exposure time maximizes the magnitudes of the charges produced by the CCD sensor. The required delay is computed during a pre-scan calibration step.

8 Claims, 4 Drawing Sheets

SYSTEM AND METHOD FOR IMPROVING THE SIGNAL TO NOISE RATIO OF A CCD SENSOR IN AN OPTICAL SCANNER

BACKGROUND OF THE INVENTION

1. Field of the Invention

The invention relates generally to optical scanners, and more particularly, to a system and method for improving the signal to noise ratio of the CCD (charge coupled device) sensor within an optical scanner.

2. Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor), an analog amplifier, an analog to digital converter, a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

In conventional optical scanners, the CCD sensor is slowly scanned across a document. The photoelectric sensing elements are continuously exposed. After a fixed exposure time, a line of charges (representing a line of pixels of the image) are dumped from the photoelectric sensing elements to one or more analog shift registers. Once the charges are dumped, the photoelectric sensing elements resume generating charges in response to the light to which they are exposed. However, before the next line of charges can be dumped, the analog shift registers must be cleared and the charges stored therein must be processed.

The processing time for the data in the CCD sensor includes the time required to serially shift a line of charges from the analog shift registers, to convert the charges to analog voltages, to digitize the voltages, to perform any desired image processing and to store the digital representation of each pixel in the RAM. Once all pixels or charges of a line have been processed, the charges of the next line can be dumped from the photoelectric sensing elements. Thus, the time required to process all pixels or charges of a line will be equal to the exposure time of the CCD sensor. Conventional optical scanners fix the exposure time equal to this processing time. For example, if it takes one microsecond (1 μsec) to process each charge or pixel, then a 2000 pixel line would require two milliseconds (2 msec) for full processing. Thus, the exposure time for the CCD sensor would be equal to a fixed two milliseconds.

The CCD sensor will generally have a fixed noise level. Thus, to optimize the signal to noise ratio of the scanner, it is desirable to maximize the optical signal received at the CCD sensing element. By maximizing the optical signal, with a fixed noise level, the signal to noise ratio can be maximized. Conventionally, this has been done by calibrating the CCD sensor so that the fixed exposure time yields a maximum charge (without saturating the CCD sensor) from the highest intensity light expected to be received.

This calibration has been done in optical scanners by exposing the CCD sensor to a reference strip of white material and adjusting the intensity of the lamp to achieve maximum charge. However, as the lamp or other components age, the maximum available light may be insufficient to produce maximum charge output from the CCD sensor. As a result, known optical scanners have been unable to maintain maximum signal to noise ratios from the CCD sensor over the life of the scanner.

It is desirable to provide a mechanism for improving the signal to noise ratio of the CCD sensor to overcome the limitations of the prior art.

SUMMARY OF THE INVENTION

The invention is a system and method for improving the signal to noise ratio of a CCD sensor within an optical scanner. The CCD sensor produces a plurality of charges representing a plurality of pixels of the CCD sensor. The magnitudes of the charges are maximized by varying the exposure time of the CCD sensor. Exposure time is varied by clocking the CCD sensor a number of times equal to the number of photoelectric sensing elements in the CCD sensor plus an additional number of clock cycles to create a delay. The additional exposure time maximizes the magnitudes of the charges produced by the CCD sensor. The required delay is computed during a pre-scan calibration step.

Calibration involves exposing the CCD sensor to a reference object (e.g., a white material). The reference object should result in a maximum charge produced by each photoelectric sensing element of the CCD sensor. If the maximum charge is not produced, then the exposure time of the CCD sensor is increased by clocking the CCD sensor the number of times required to shift out all charges plus an additional number of clock cycles to produce the desired increase in exposure time.

The system of the invention includes a CCD sensor comprising an array of photoelectric sensing elements, an analog amplifier, an analog to digital converter, a slave controller, a master controller, a random access memory (RAM) and a host interface circuit. The CCD sensor produces a plurality of charges representing a line of pixels of the image. The amplifier sequentially converts each charge to an analog voltage as the charges are serially shifted out of the CCD sensor. The analog to digital converter digitizes the analog voltages.

The slave controller synchronizes operation of the CCD sensor and the analog to digital converter. In addition, the slave controller controls image processing and formatting of the digitized pixel data and controls storage of the digitized pixel data in the RAM and communication of the digitized pixel data to a host computer via the host interface circuit. The master controller initiates a scan operation and initializes the slave controller.

The foregoing and other objects, features and advantages of the invention will be apparent from the following, more particular description of a preferred embodiment of the invention, as illustrated in the accompanying drawings.

DETAILED DESCRIPTION OF THE PREFERRED EMBODIMENT

The preferred embodiment of the invention is discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. Also in the figures, the left most digits of each reference number corresponds to the figure in which the reference number is first used.

Figure 1:
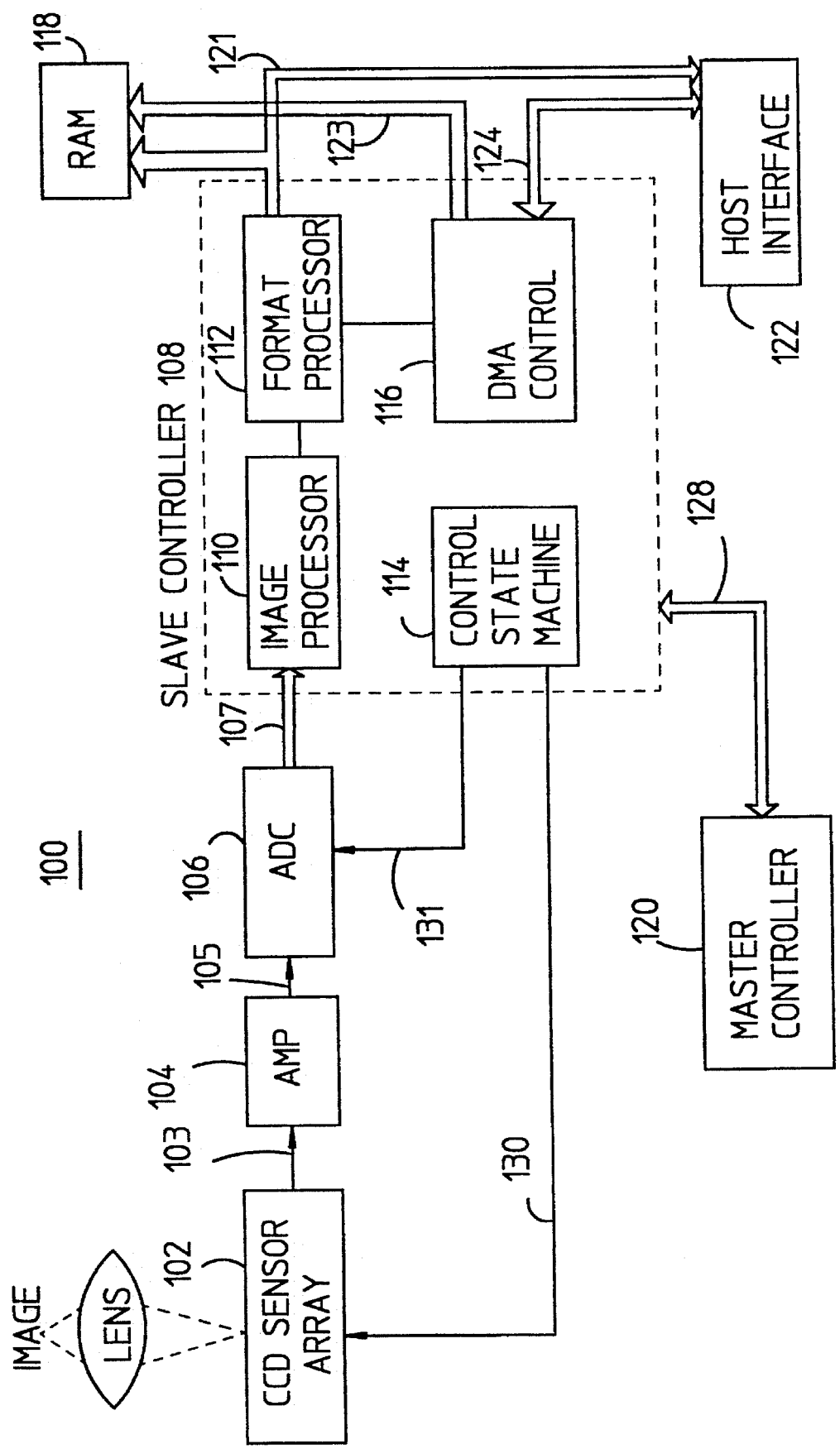
FIG. 1 is a high level block diagram of the image capture system of the invention.

FIG. 1 is a high level block diagram of an image capture system 100 of the invention. Image capture system 100 may be used with an optical scanner such as that described in commonly owned U.S. Pat. No. 4,926,041 to Boyd, the full text of which is incorporated herein by reference as if reproduced in full below.

Image capture system 100 includes a CCD (charge coupled device) sensor 102, an analog amplifier 104, an analog to digital converter (ADC) 106, a slave controller 108, a master controller 120, a random access memory (RAM) 118 and a host interface 122. CCD sensor 102 includes a linear array of photoelectric sensing elements 204 (described below with reference to FIG. 2). Each element 204 is configured to capture a pixel of an image and to produce an electrical charge corresponding to the intensity of light received.

Analog amplifier 104 is configured to receive a serial stream of charges from CCD sensor 102 over a line 103 and to sequentially convert each charge to an analog voltage. ADC 106 is configured to receive an analog voltage from amplifier 104 over a line 105 and to digitize the analog voltage. For example, ADC 106 may output an 8-bit digital word representing the varying gray scale of the pixel represented by the received voltage.

Slave controller 108 controls the timing of CCD sensor 102 and ADC 106 over controls lines 130 and control lines 131. Slave controller 108 receives the digitized data from ADC 106 over bus 107, provides any required formatting and/or image processing and stores the digitized data in RAM 118 via bus 121. In addition, slave controller 108 manages the transfer of data from RAM 118 to a host (not shown) such as an image processing system or general purpose computer system via host interface 122. Master controller 120 is provided to initiate an image scanning operation and to set up and supervise slave controller 108 via bus 128.

Slave controller 108 includes an image processor 110, a format processor 112, a control state machine 114 and a direct memory access (DMA) controller 116. Control state machine 114 provides clocking and other control signals to synchronize operation of CCD sensor 102 via control lines 130 and ADC 106 via control lines 131. Control state machine 114 also controls the scanning of CCD sensor 102 across an image.

DMA controller 116 controls the storage and removal of data from RAM 118. DMA controller 116 communicates with RAM 118 via bus 123 and with host interface 122 via bus 124. Image processor 110 provides image processing capabilities to image capture system 100. For example, image processor 110 may alter the resolution of the digitized image from ADC 106. Format processor 112 allows the data format of the digitized image to be changed prior to being stored in RAM 118 via bus 121. For example, format processor 112 may present the data representing the digitized image to RAM 118 in 1, 4, or 8 bits per pixel format. Format processor 112 also communicates with a host via bus 121.

Exchange of data between RAM 118 and the host computer via bus 121 is discussed in detail in commonly owned U.S. Pat. No. 5,239,387 to Stein et al., the full text of which is incorporated herein by reference as if reproduced in full below.

In the preferred embodiment, slave controller 108 is implemented as an ASIC (application specific integrated circuit). Master controller 120 is a general purpose microprocessor such as a Motorola 68HC11, available from Motorola, Inc., Schaumburg, Ill. CCD sensor 102 is a Toshiba TCD137C, available frown Toshiba America Electronic Components, Inc., Irvine, Calif.

Figure 2:
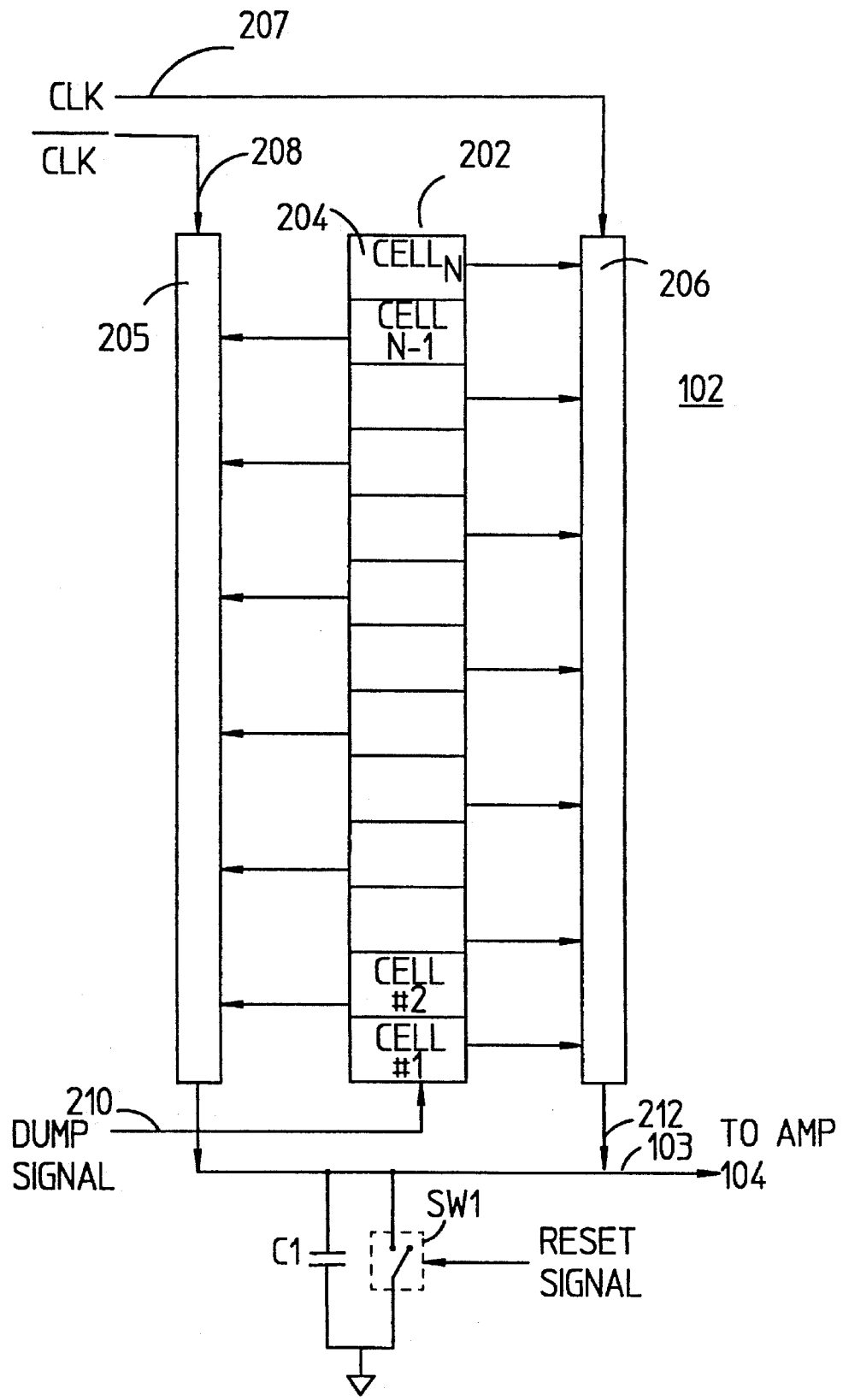
FIG. 2 is a high level block diagram of a CCD sensor 102.

FIG. 2 is a block diagram illustrating operation of CCD sensor 102. CCD sensor 102 includes a linear array 202 of photoelectric sensing elements or cells 204. Linear array 202 may contain, for example, 2,000 photoelectric sensing elements 204. Each sensing element 204 is configured to receive light (reflected from or transmitted through an image) and to produce an electric charge in response thereto. The charge is collected by a capacitor (not shown) within each photoelectric sensing element 204. Each sensing element 204 corresponds to a pixel of the image being captured.

Each photoelectric sensing element 204 is coupled to a bucket or register cell of an analog shift register 205,206. In the preferred embodiment, sensing elements 204 are connected to analog shift registers 205,206 in an interleaved fashion. For example, the first and all subsequent odd numbered sensing elements 204 are electrically connected to analog shift register 206. The second and all subsequent even numbered sensing elements 204 are connected to analog shift register 205.

Linear array 202 is configured to dump the charge stored in the capacitors of the photoelectric sensing elements 204 into analog shift registers 205,206 in response to a dump signal 210 from control state machine 114. The analog shift registers then store these charges until they can be shifted out to amplifier 104 via a line 103.

Control state machine 114 provides a clock signal 207 to analog shift register 206. Similarly, control state machine 114 provides an inverted clock signal 208 to analog shift register 205. Inverted clock 208 is 180° out of phase with respect to clock signal 207. Once the charges have been dumped from linear array 202 into analog shift registers 205,206, control state machine 114 begins to apply clock signal 207 and inverted clock signal 208 to analog shift registers 206,205 respectively. Clock signal 207 will cause analog shift register 206 to shift a first charge out of analog shift register 206 via line 212. This first charge will be collected by capacitor C1. The first charge will cause capacitor C1 to charge to a voltage which is then sensed on line 103 by analog amplifier 104. Analog amplifier 104 then provides an amplified analog voltage to ADC 106 for digitization and further downstream processing.

Control state machine 114 then provides a reset signal to a switch SW1. The reset signal causes switch SW1 to close and, thereby, short capacitor C1 to ground. This dissipates the first charge on capacitor C1. Once the charge on capacitor C1 has been dissipated, switch SW1 is opened. Next, the inverted clock signal 208 causes analog shift register 205 to shift a second charge onto line 103. This second charge causes capacitor C1 to be charged to a new voltage level. The process described above then repeats. Clock signal 207 and inverted clock signal 208 alternate the strobing of analog shift registers 206,205 until all charges have been shifted out, amplified by amplifier 104 and digitized by ADC 106.

When exposed to light, linear array 202 will continue to collect light and generate corresponding charges in each of the photoelectric sensing elements 204. Each time dump signal 210 causes the charges to be dumped into analog shift registers 205,206, the linear array 202 is reset. Thus, the exposure time of each photoelectric sensing element 204 will be equal to the period between receipt of dump signals 210. In a conventional image capture system as discussed above, control state machine 114 will clock analog shift registers 205,206 a total of N times. Analog shift register 206 will be clocked N/2 times in order to clear all charges from its cells. Similarly, analog shift register 205 will be clocked N/2 times in order to clear all charges out of its cells. As soon as the last charge is cleared from the analog shift registers, control state machine 114 will issue a new dump signal 210 to linear array 202. This results in a fixed exposure time for the CCD sensor 102.

The present invention maximizes the signal-to-noise ratio of CCD sensor 102 by providing a variable exposure time for linear array 202. Linear array 202 is exposed to the image for a period which allows maximization of the collected charges without saturating the photoelectric sensing elements 204. This is done by varying the time between dump signals 210. The inventors have developed a system and method for implementing this variable exposure time with a minimum of additional required hardware.

Figure 3:
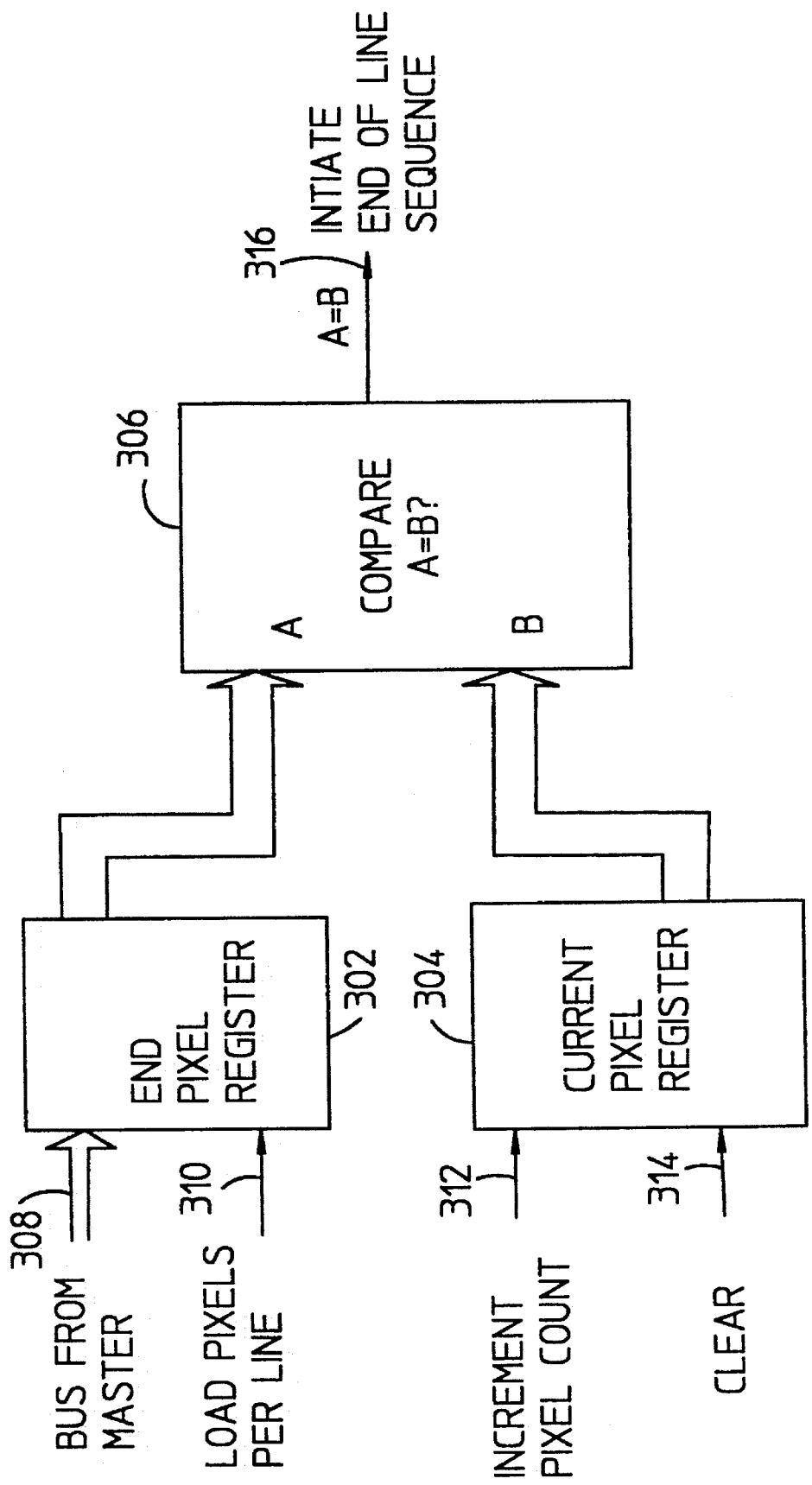
FIG. 3 is a block diagram illustrating the functionality of a control state machine 114 in controlling the exposure time of a CCD sensor 102.

FIG. 3 illustrates a preferred implementation for controlling the exposure time of image capture system 100. Control state machine 114 includes an END PIXEL register 302, a CURRENT PIXEL register 304 and a comparator 306. END PIXEL register 302 is configured to store an END PIXEL value supplied to slave controller 108 by master controller 120 via parallel bus 308. A LOAD-PIXELS-PER-LINE strobe 310 from master controller 120 controls the loading of an END PIXEL value from bus 308 into END PIXEL register 302.

CURRENT PIXEL register 304 stores the index to the CURRENT PIXEL being shifted out of analog shift registers 205,206. An INCREMENT PIXEL COUNT signal 312 from control state machine 114 will cause the CURRENT PIXEL value to be incremented by one. A CLEAR signal 314 from control state machine 114 will cause CURRENT PIXEL register 304 to be cleared.

A comparator 306 compares the CURRENT PIXEL value from CURRENT PIXEL register 304 with the END PIXEL value from END PIXEL register 302. When CURRENT PIXEL is equal to END PIXEL, comparator 306 outputs an END-OF-LINE signal 316. END-OF-LINE signal 316 is provided to control state machine 114 and causes control state machine 114 to initiate an END-OF-LINE sequence. The END-OF-LINE sequence results in generation of a dump signal 210 for processing of the next line of data from linear array 202. The END-OF-LINE sequence also resets CURRENT PIXEL register 304 via CLEAR signal 314.

An END PIXEL value may be selected by master controller 120 which is larger than the actual number of pixels in linear array 202. Because the END PIXEL value will be greater than the actual number of pixels in linear array 202, analog shift registers 205,206 will continue to be shifted or clocked even though all charges have been shifted out. This will result in an increased exposure time for linear array 202.

Thus, the present invention allows the exposure time of CCD sensor 102 to be adjusted by varying the value of END PIXEL. Adjustment is done in a calibration step. Calibration is performed, for example, at the beginning of a document scan by image capture system 100. For calibration, CCD sensor 102 is exposed to a reference material. The reference material is generally a white strip within an optical scanner. With the system lamp at maximum power, the white strip should produce maximum charge from each pixel of the CCD sensor 102. Calibration involves adjusting the maximum charge to a point just short of saturation of the CCD sensor. The point of saturation is generally specified by the manufacturer of the CCD sensor.

Figure 4:
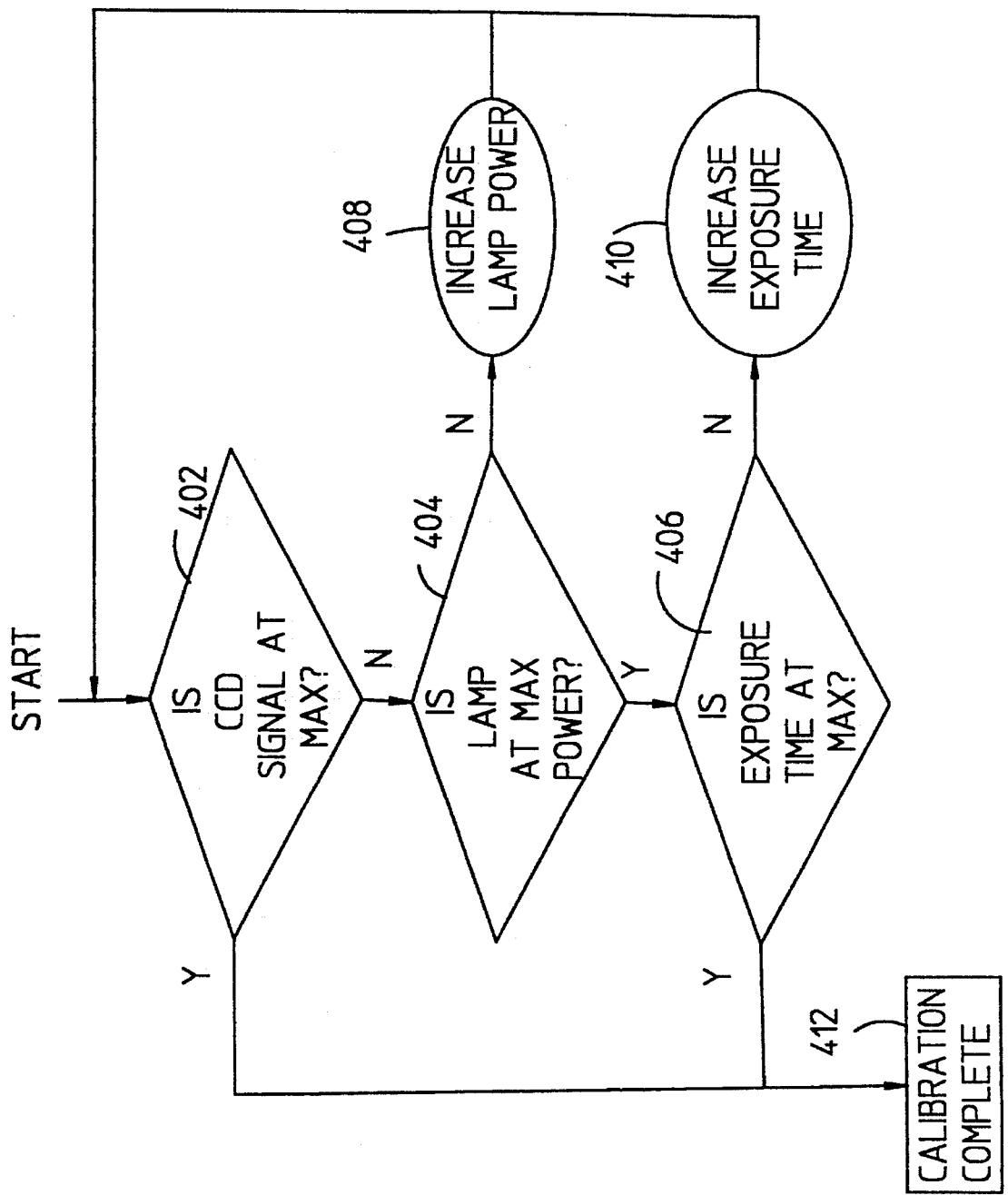
FIG. 4 is a flow chart illustrating the steps in calibrating the image capture system of the invention for maximum signal to noise ratio.

Referring now to FIG. 4, calibration of image capture system 200 is described. At a step 402, the charges from a selected one or more sensing elements 204 of CCD sensor 102 are checked to see if they are at a desired maximum value. This may be done, for example, by master controller 120 which checks the digitized charge values being received by slave controller 108. If the charge values are at the desired level, then calibration is complete as indicated at a step 412.

If the charge values are not at the desired level, then the method proceeds to a step 404. At step 404, the lamp is checked to determine whether it is at maximum power. If the lamp is not at maximum power, then the lamp power is increased at step 408, and the method returns to step 402. If the lamp is at maximum power, then the method proceeds to a step 406. At step 406, the exposure time is checked to determine whether it is at a maximum value. If the exposure time is not at a maximum value, then the exposure time is increased at step 410, and the method returns to step 402. If the exposure time is at the maximum value, then the method ends at step 412.

As discussed above, the exposure time is adjusted by changing the value of END PIXEL. For example, if the CCD charge is at 50% of a desired value, the END PIXEL value must be doubled. For a 2000 pixel CCD sensor 102, the value of END PIXEL would be set at 4000. This would result in a doubling of the CCD exposure time and an increase in the desired charge level to the desired 100%.

While the invention is described in terms of a variable exposure time, it should be understood that the time (or number of clock cycles) required to shift all charges out of analog shift registers 205,206 is fixed and will provide a minimum exposure time. The exposure time cannot be reduced below this minimum without losing pixels of the image. Therefore, in the preferred embodiment, the calibration method illustrated in FIG. 4 will begin with this minimum exposure time and will increase the exposure time as required. It is preferred that calibration be performed before each new document sheet is scanned.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. An image capture system comprising:

a charge coupled device sensor including an analog shift register, and an array of N sensing elements configured to produce a plurality of charges in response to light incident thereon and to dump said charges into said analog shift register upon receipt of a dump signal, wherein said charges are read out of said analog shift register with an N-cycle clock signal, said N-cycle clock signal defining an exposure time of said charge coupled device sensor and the delay between consecutive dump signals;

means for comparing a magnitude of one of said charges generated by said charge coupled device sensor to a reference value; and calibration means for changing the number of clock cycles of said N-cycle clock signal based on said comparison of one of said charges and said reference value to adjust said exposure time of said charge coupled device sensor.

2. The image capture system of claim 1, further comprising:

amplifier means for receiving said charges and for converting said charges to analog voltages;

digitizer means for digitizing said analog voltages; and memory means for storing said digitized voltages.

3. The image capture system of claim 2, further comprising:

control means for coordinating and controlling said charge coupled device sensor, said digitizer means and said memory means.

4. The image capture system of claim 3, wherein said exposure time is computed in terms of a number of pixel shifts to be performed by said charge coupled device sensor, and wherein said calibration means comprises:

a first register configured to store an end pixel value for said charge coupled device sensor, said end pixel value representing a desired exposure time;

a second register configured to store a current pixel value for said charge coupled device sensor, said current pixel value representing an elapsed exposure time; and comparator means for comparing said end pixel value to said current pixel value and for initiating an end of line sequence, said end of line sequence terminating exposure of said charge coupled device sensor.

5. An image capture system comprising:

a charge coupled device sensor having an array of N photoelectric sensing elements and an analog shift register, each of said N photoelectric sensing elements being configured to receive light from an image and to produce an electric charge corresponding to an intensity of the received light, said array of photoelectric sensing elements being configured to dump said electric charges to said analog shift register in response to a dump signal, said analog shift register being configured to sequentially shift one of said electric charges out of said charge coupled device in response to a clock signal;

amplifier means for receiving an electric charge from said analog shift register and for producing an analog voltage corresponding thereto;

conversion means for receiving an analog voltage from said amplifier means and for digitizing said analog voltage to produce a digitized voltage;

memory means for storing said digitized voltage; and control means for generating M clock cycles, for providing said M clock cycles to said analog shift register, and for generating said dump signal at a conclusion of said M clock cycles, wherein M is greater than N and wherein a difference between M and N is equal to an increased exposure period for said photoelectric sensing elements of said charge coupled device sensor.

6. A method for digitizing and storing an image using a charge coupled device sensor having a linear array of photoelectric sensing elements and an N-length shift register for receiving charge values from the linear array, the method comprising the steps of:

(a) determining a calibrated exposure time required to achieve a desired charge magnitude from the array:

(b) exposing the array to the image for said calibrated exposure time to produce a digital representation of a line of said image, wherein said calibrated exposure time is implemented by changing an N-cycle clock signal applied to the N-length shift register to an M-cycle clock signal, wherein M is greater than N;

(c) storing said digital representation of said line in a memory; and (d) repeating steps (b) and (c) until the image has been digitized and stored.

7. The method of claim 6, wherein said step (a) comprises the steps of:

exposing the charge coupled device sensor to light from a reference image;

determining a charge generated by said charge coupled device sensor;

comparing said charge generated by said charge coupled device sensor to a desired charge value; and adjusting an exposure time of said charge coupled device sensor to achieve said desired charge value, wherein adjusting said exposure time to equal said calibrated exposure time produces said desired charge.

8. The method of claim 7, wherein said steps (b) and (c) comprise the steps of:

(1) exposing the array to light from the image;

(2) dumping charges from the array into corresponding cells of an analog shift register;

(3) serially shifting a first charge out of said shift register in response to a shift signal;

(4) converting said first charge to a voltage;

(5) digitizing said voltage;

(6) storing said digitized voltage in a memory;

(7) repeating steps (3) through (6) until said charges have been shifted out of said analog shift register and are stored in said memory;

(8) serially shifting said shift register an additional number of clock cycles, wherein said shifting extends an exposure time of the array; and (9) repeating step (8) until said calibrated exposure time has elapsed.

* * * * *